United States Patent
Dangy-Caye

(10) Patent No.: US 11,061,690 B2
(45) Date of Patent: *Jul. 13, 2021

(54) METHOD FOR UPDATING A BOOT LOADER OF A MULTIPROCESSOR DEVICE

(71) Applicant: SAGEMCOM BROADBAND SAS, Rueil Malmaison (FR)

(72) Inventor: Nicolas Dangy-Caye, Rueil-Malmaison (FR)

(73) Assignee: SAGEMCOM BROADBAND SAS, Rueil Malmaison (FR)

(*) Notice: Subject to any disclaimer, the term of this patent is extended or adjusted under 35 U.S.C. 154(b) by 0 days.

This patent is subject to a terminal disclaimer.

(21) Appl. No.: 16/370,194

(22) Filed: Mar. 29, 2019

(65) Prior Publication Data
US 2019/0227811 A1  Jul. 25, 2019

Related U.S. Application Data

(63) Continuation of application No. 14/917,710, filed as application No. PCT/EP2014/069157 on Sep. 9, 2014, now Pat. No. 10,289,422.

(30) Foreign Application Priority Data

Sep. 10, 2013  (FR) ..................... 13/58710

(51) Int. Cl.
 *G06F 11/20* (2006.01)
 *G06F 9/4401* (2018.01)
 (Continued)

(52) U.S. Cl.
 CPC .............. *G06F 9/4406* (2013.01); *G06F 1/30* (2013.01); *G06F 8/654* (2018.02);
 (Continued)

(58) Field of Classification Search
CPC . G06F 9/4406; G06F 11/1441; G06F 11/1433
See application file for complete search history.

(56) References Cited

U.S. PATENT DOCUMENTS

| 7,275,153 B2* | 9/2007 | Kim ..................... G06F 11/1433 713/2 |
| 8,442,792 B1 | 5/2013 | Elberbaum |

(Continued)

OTHER PUBLICATIONS

Dec. 8, 2014 International Search Report and Written Opinion issued in PCT/EP2014/069157 (9 pages).

(Continued)

*Primary Examiner* — Lewis A Bullock, Jr.
*Assistant Examiner* — Mohammad H Kabir
(74) *Attorney, Agent, or Firm* — Nixon & Vanderhye, P.C.

(57) ABSTRACT

A device comprises a first processor and a second processor, the first processor being able to execute a boot loader. The device implements a phase of boot-securing in the event of an electrical anomaly occurring while the boot loader is being updated, the phase of boot-securing being implemented by way of an emergency power supply source acting as a relay for a main power supply, the phase of boot-securing comprising the following steps: stopping (203) the current updating of the boot loader; and invalidating (205) the boot loader. The device implements a phase of delayed booting of the second processor, enabling to boot the device in a boot loader update mode if said stored boot loader is invalid.

6 Claims, 3 Drawing Sheets

(51) Int. Cl.
  *G06F 8/654* (2018.01)
  *G06F 11/14* (2006.01)
  *G06F 1/30* (2006.01)
  *G06F 8/65* (2018.01)

(52) U.S. Cl.
  CPC ............ *G06F 11/1433* (2013.01); *G06F 8/65* (2013.01); *G06F 11/1441* (2013.01)

(56) References Cited

U.S. PATENT DOCUMENTS

| | | | |
|---|---|---|---|
| 8,707,019 B2 | 4/2014 | Shroni | |
| 8,713,559 B2 | 4/2014 | Fallon | |
| 8,914,627 B2 * | 12/2014 | Park | H04L 9/3242 713/2 |
| 9,077,654 B2 | 7/2015 | Davis | |
| 9,274,805 B2 | 3/2016 | Anderson | |
| 9,292,301 B1 | 3/2016 | Calhoun | |
| 2007/0169098 A1 | 7/2007 | Kikuchi | |
| 2007/0174601 A1 | 7/2007 | Douglas | |
| 2007/0180223 A1 | 8/2007 | Tanaka | |
| 2008/0086652 A1 | 4/2008 | Krieger | |
| 2009/0094450 A1 | 4/2009 | Krzyzanowski | |
| 2010/0131694 A1 | 5/2010 | Kelly | |
| 2011/0307711 A1 | 12/2011 | Novak | |
| 2012/0124568 A1 | 5/2012 | Fallon | |
| 2012/0240107 A1 | 9/2012 | Brescia | |
| 2012/0297043 A1 | 11/2012 | Davis | |
| 2013/0007437 A1 | 1/2013 | Shroni | |
| 2013/0227261 A1 | 8/2013 | Anderson | |
| 2014/0026124 A1 | 1/2014 | Gilbert | |
| 2014/0136826 A1 | 5/2014 | Paek | |
| 2014/0208091 A1 | 7/2014 | Koning | |
| 2014/0281455 A1 | 9/2014 | Kochar | |
| 2017/0010908 A1 | 1/2017 | Matzek | |
| 2017/0097819 A1 | 4/2017 | Ozturk | |
| 2017/0277530 A1 | 9/2017 | Adams | |
| 2018/0032349 A1 | 2/2018 | Bhimanadhuni | |

OTHER PUBLICATIONS

Hartono et al., "A scalable bootloader and debugger design for an NoC-based multi-processor SoC", IEEE, Nov. 2015, pp. 1-5 <https://ieeexplore.ieee.org/stamp/stamp.jsp?tp=&arnumber=7449150> (Year: 2015).

Kluge et al., "The Boot Process in Real-time Manycore Processors", ACM, Oct. 2014, pp. 1-10; <https://dl .acm.org/citation .cfm?id=2659816> (Year: 2014).

Redini et al., "BootStomp: On the Security of Bootloaders in Mobile Devices", USENIX, Aug. 2017, pp. 1-19; <https://www.usenix.org/system/files/conference/usenixsecurity17 /sec17-redini .pdf> (Year: 2017).

* cited by examiner

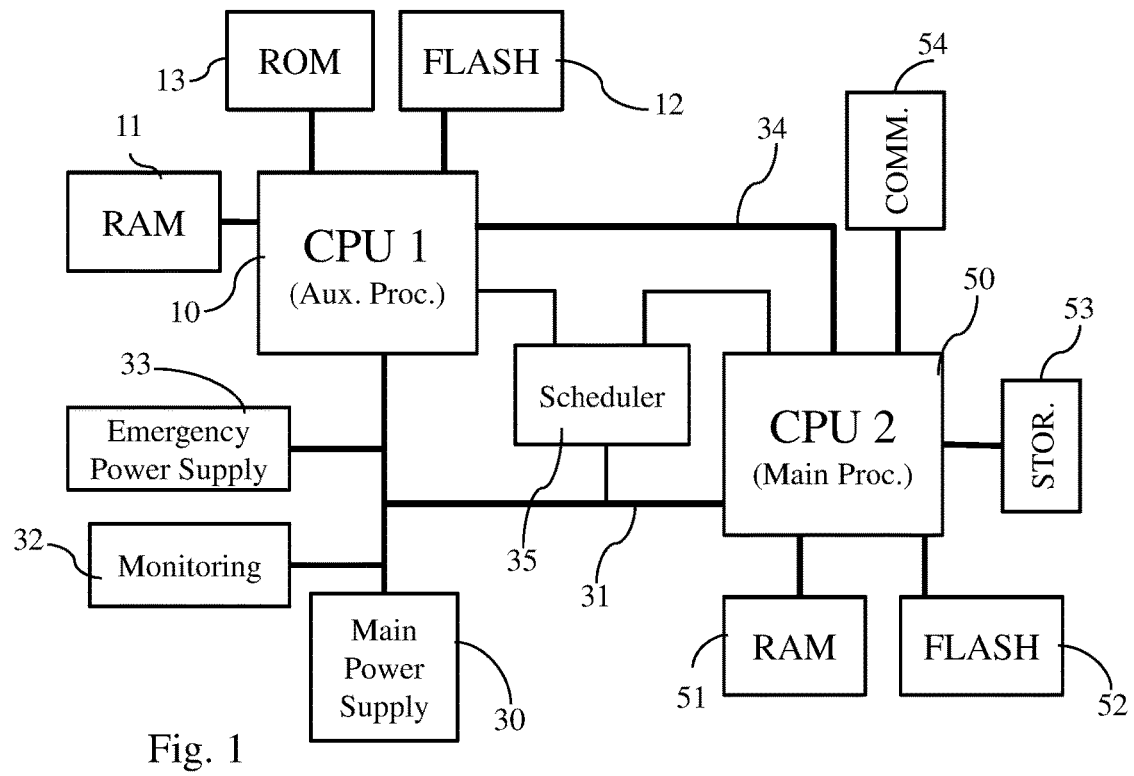
Fig. 1
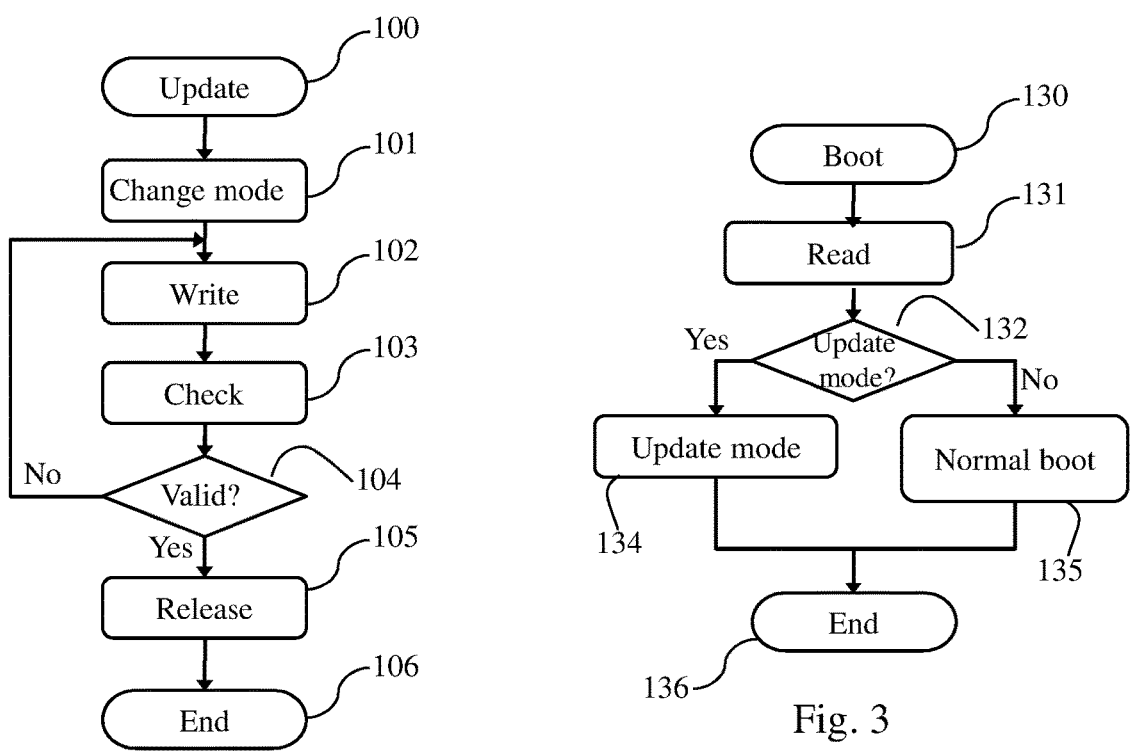
Fig. 2
Fig. 3

METHOD FOR UPDATING A BOOT LOADER OF A MULTIPROCESSOR DEVICE

This application is a continuation of U.S. application Ser. No. 14/917,710, filed on Mar. 9, 2016, which is the U.S. national phase of International Application No. PCT/EP2014/069157, filed on Sep. 9, 2014, which designated the U.S. and claims priority to French Patent Application No. 13/58710, filed on Sep. 10, 2013, the entire contents of each of which are hereby incorporated by reference.

The present invention relates to a method for updating a boot loader of a multiprocessor system, and a multiprocessor system able to implement the method.

A large number of electronic devices include software. The software of these devices is often broken down into two parts: firstly the boot loader and secondly the application software.

In current electronic devices, it is very often possible to update the software, in particular with respect to communicating products connected to a network. The updating of the boot loader is a critical phase. A display, during this updating, of a warning message specifying that the power supply to the electronic device should not be cut off is well known, but offers no security when facing an electrical anomaly, such as an accidental or ill-intentioned power supply cut.

For this purpose, a dual boot solution consists of providing two non-volatile rewritable memory segments, in which a first segment comprises a normal boot loader and a second segment comprises a new boot loader. After the writing of the new boot loader in memory, a check on the integrity of the software written is made before switching to the new boot loader. This method requires substantially doubling the capacity of the non-volatile rewritable memory, which increases the cost of such a product.

It is desirable to overcome the aforementioned drawbacks of the prior art.

The invention relates to a method for updating a boot loader stored in a rewritable non-volatile memory of a device comprising a first processor and a second processor, the first processor being able to execute the boot loader, the method being implemented by the device. The method comprises a phase of boot-securing, implemented in the event of an electrical anomaly occurring during updating of the boot loader, the phase of boot-securing being implemented by way of an emergency power supply source acting as a relay for a main power supply when an electrical anomaly is present, the phase of boot-securing comprising the following steps: stopping the current updating of the boot loader; and invalidating the boot loader for the first processor. The method further comprises a phase of delayed booting of the second processor with respect to the booting of the first processor enabling, when the boot loader is not valid, booting the device in a mode of updating of the boot loader. Thus it is possible to perform an updating of the boot loader on a device comprising the rewritable non-volatile memory enabling storing a single copy of the boot loader. With such a method, a problem of uncontrollable rebooting following corruption of this memory that occurred during an updating of the boot loader, in particular because of a power supply cut, is not to be feared.

According to one embodiment, the method comprises a phase of updating the boot loader, implemented by the second processor, comprising the following steps: switching the first processor into the mode of updating of the boot loader; writing a new boot loader in the rewritable non-volatile memory; checking whether the new boot loader as written in the rewritable non-volatile memory is valid; repeating the phase of updating from the step consisting of writing the new boot loader, when the new boot loader as written is not valid; and switching the first processor into a usual operating mode when the new software as written is valid. Thus the boot loader is updated.

According to one embodiment, the method further comprises the following steps, implemented by the second processor, during a booting of said device: checking whether the first processor is in a normal operating state able to communicate with the second processor; and initiating the phase of updating the boot loader when the first processor is not in the normal operating state. Thus the check enables performing a boot even if the boot loader is invalidated. In this case, the device boots up by way of the second processor in order to go into the mode of updating.

According to one embodiment, for checking the operating state of the first processor, the second processor performs the following steps: sending a first message to said processor; considering the operating state of the first processor to be normal when the second processor receives a second message acknowledging the first message within a predefined period; and considering the operating state of the first processor to be abnormal when the second processor does not receive the second message acknowledging the first message within the predefined period. Thus the check is obtained by a phase of synchronisation between the first processor and the second processor. The operating state of the first processor is judged to be abnormal if the first processor does not respond to the message from the second processor asking whether the first processor is indeed in a normal operating state.

According to one embodiment, the method further comprises, when said device is being switched off, the following steps: checking whether the boot loader stored in the rewritable non-volatile memory is valid; and initiating, by way of the second processor, the phase of updating boot loader when the boot loader stored in the rewritable non-volatile memory is not valid. Thus it is possible to detect problems of corruption of the rewritable non-volatile memory that occurred during normal operation. This enables replacing the corrupted boot loader and preventing malfunctioning.

According to one embodiment, the phase of boot-securing of the method further comprises the step consisting, during the phase of boot-securing, of stopping the electrical supply to secondary components that are not essential to the functioning of the first processor and of the second processor. Thus only the components essential for invalidating the boot loader being updated are power supplied, in order to minimise the electrical consumption of the device during this phase. Thus the sizing of the emergency power supply in terms of autonomy to be provided may be reduced.

The invention also relates to a device comprising a first processor and a second processor, the first processor being able to execute a boot loader stored in a rewritable non-volatile memory, the device comprising means for boot-securing implemented when an electrical anomaly occurs during an update of the boot loader, the means for boot-securing being implemented by way of an emergency power supply source acting as a relay for a main power supply when an electrical anomaly is present, the means for boot-securing comprising: means for stopping the current updating of the boot loader; and means for invalidating the boot loader for the first processor. The device further comprises means for delayed booting of the second processor with respect to the booting of the first processor, enabling, when the boot loader is not valid, booting the device in a mode of updating of the boot loader.

According to one embodiment, the emergency power supply source is taken in the group comprising a capacitor, a supercapacitor, an electrical battery and an accumulator. Thus the cost of the emergency power supply is low.

According to one embodiment, the device comprises means for monitoring the main power supply based on a comparator having a first input where a reference voltage value is injected and a second input where a voltage value derived from the main power supply via a voltage bridge divider is injected. Thus an electrical anomaly is detected in a simple manner.

According to one embodiment, the device comprises means for monitoring the main power supply based on a comparator and an analogue to digital converter, the analogue to digital converter being adapted for converting the voltage of the main power supply into a digital value and the comparator being adapted for comparing said digital value with a predefined threshold.

The features of the invention mentioned above, as well as others, will emerge more clearly from a reading of the following description of at least one example embodiment, said description being given in relation to the accompanying drawings, among which:

FIG. 1 is a schematic view of a hardware architecture of a dual-processor device, according to one embodiment of the invention;

FIG. 2 is a schematic illustration of an algorithm for updating a boot loader, the algorithm being executed by a processor of the device of FIG. 1;

FIG. 3 is a schematic illustration of a boot algorithm for the auxiliary processor of FIG. 1;

Figure 4:
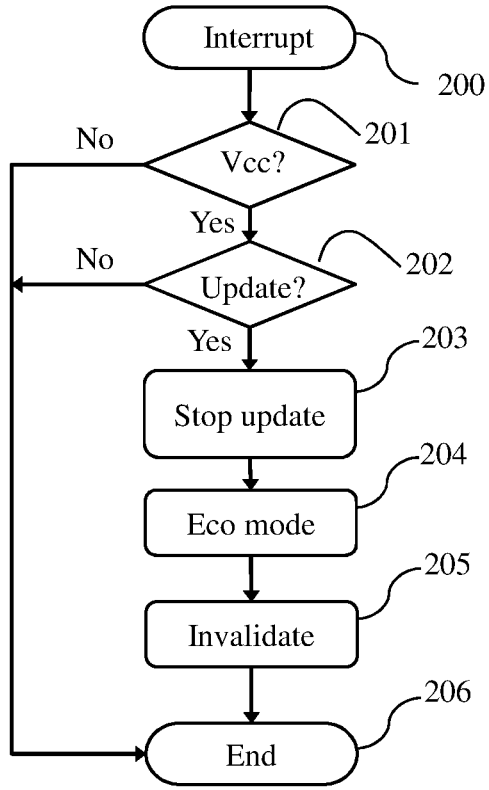
FIG. 4 is a schematic illustration of an algorithm for managing an interruption during a loss of power supply, according to a particular embodiment of the invention.

The following detailed description refers to a device comprising a first processor or microprocessor, referred to as auxiliary processor, and a second processor or microprocessor, referred to as main processor. The auxiliary processor may be dedicated to the management of the booting of the device and monitoring same in standby mode. The main processor may be responsible for the main function fulfilled by the device. However, this is merely an example and the auxiliary processor may just as well be responsible for any other function. The following detailed description refers only to the functionalities implemented by the auxiliary processor and by the main processor in the context of updating a boot loader for booting said auxiliary processor.

FIG. 1 schematically illustrates an architecture of a dual-processor device according to one embodiment of the invention. This architecture comprises an auxiliary processor 10 and a main processor 50, both being electrically supplied by a power supply 30, referred to as main power supply.

The auxiliary processor 10 is connected, for example through a bus, to a random access memory RAM 11, to a rewritable non-volatile memory 12, such as a memory of Flash type, and to a read only memory ROM 13.

The main processor 50 is connected, for example through a bus to a RAM 51, to a rewritable non-volatile memory 52 such as a memory of Flash type, and to a fixed or removable storage unit 53. This storage unit 53 is for example a hard disk drive HDD, or a removable memory cards reader. The main processor 50 is also connected to external communication means 54 enabling in particular to receive updates of all or part of the software of the device. These external communication means 54 may be a communication port of the Ethernet, xDSL (the acronym for designating technologies of the digital subscriber line type) or WiFi type, or a communication port of the USB (Universal Serial Bus) type.

Moreover, the auxiliary processor 10 and the main processor 50 are connected by internal communication means 34, in order to exchange data in the form of messages or signals. These internal communication means 34 are for example a bus, such as a serial bus, or a parallel bus, or input/output ports, used separately or conjointly.

Finally, the power supply 30 supplying the dual-processor device supplies the two processors through a power supply line 31. Monitoring means 32 for monitoring any electrical anomaly occurring on the power supply 30 are present on the power supply line 31. The monitoring means 32 are preferably adapted for monitoring the voltage delivered by the power supply 30.

The monitoring means 3 are for example implemented by means of a comparator. A reference DC voltage signal, for example fixed at 1.8 V or 3.3 V obtained by means of a voltage-reducing DC to DC converter connected to the power supply line 31, is injected onto a first input of the comparator. The power supply signal 30, for example fixed at 12 V when no electrical anomaly is present, is injected onto a second input of the comparator, after passage through a voltage bridge divider aimed at bringing the voltage to a value substantially equal to said reference DC voltage. The comparator is thus adapted for detecting when the power supply voltage 30 drops following an electrical anomaly.

In a variant embodiment, the monitoring means 32 are for example implemented by means of a comparator coupled to an analogue to digital converter. The analogue to digital converter is adapted for receiving as an input the voltage delivered by the power supply 30. The comparator is then adapted for comparing a digital value representing the voltage delivered by the power supply 30 and a predefined threshold, for example fixed at 10 V when the voltage expected from the electrical supply 30 is 12 V. Such an analogue to digital converter may be integrated in the auxiliary processor 10 or in the main processor 50.

An emergency power supply 33 is also present on the power supply line 31, intended to supply, in the event of an electrical anomaly, at least the two processors and components necessary for the functioning of the two processors. The monitoring means 32 are adapted for warning the main processor 50 in the event of an electrical anomaly incurred by the device. Such electrical anomaly may for example be a simple temporary drop in voltage. The electrical anomaly may also be break in the electrical supply 30.

The emergency power supply 33 is for example a battery, an accumulator, a capacitor or a supercapacitor. The capacitance of the emergency power supply 33 is chosen so as to allow functioning of the vital components during a period of time enabling, if necessary, invalidating the boot loader, or to erase all or part of the rewritable non-volatile memory 12. The vital components comprise the main processor 50 and the auxiliary processor 10 plus the components necessary for their respective functionings in order to ensure the operation consisting of deleting all or part of the rewritable non-volatile memory 12, or invalidating the boot loader.

Each of the processors, the auxiliary processor 10 and the main processor 50, are able to execute a set of instructions for implementing all or some of the algorithms described below. The auxiliary processor 10 is capable of executing instructions from the rewritable non-volatile memory 12 and/or from the RAM 11. The auxiliary processor 10 is also capable of executing instructions from the ROM 13, typically after loading into the RAM 11. The main processor 50 is capable of executing instructions from the rewritable non-volatile memory 52 and/or from the RAM 51.

The auxiliary processor 10 uses firstly a boot loader, for the device, present in the rewritable non-volatile memory 12 at each sequence of booting of said device. Moreover, for updating the boot loader, the auxiliary processor 10 has update software in the ROM 13. This update software is able to delete and write, in the rewritable non-volatile memory 12, a new boot loader transmitted by the main processor 50 via the internal communication means 34.

The main processor 50 is able to execute an update application for updating the boot loader for booting the auxiliary processor 10. This update application may be stored in the rewritable non-volatile memory 52. The main processor 50 is further adapted for executing other types of application, stored in the rewritable non-volatile memory 52 or in the storage unit 53.

Finally, the device is equipped with means 35 for sequencing the booting between the auxiliary processor 10 and the main processor 50, referred to as scheduler. The scheduler 35 firstly initiates the booting of the auxiliary processor 10, and then that of the main processor 50 delayed with respect to the booting of the auxiliary processor 10. In a normal booting situation, the auxiliary processor 10 executes the boot loader. Said boot loader then boots the main processor 50 and the two processors synchronise on each other. The delayed booting is used when the boot loader used by the auxiliary processor 10 is corrupted. The delayed booting enables the device to partially boot anyway, in order to update the defective boot loader.

According to a preferred embodiment, the auxiliary processor 10 is a microcontroller including the RAM 11, the rewritable non-volatile memory 12 and the ROM 13.

According to a variant, the auxiliary processor 10 and the main processor 50 are integrated in a component of the SoC (System on Chip) type.

Some of the elements shown, in particular the auxiliary processor 10, the main processor 50 and the scheduler 35, may be produced in various forms, in a unitary or distributed manner, by way of hardware components, such as Application Specific Integrated Circuits ASICs or Field Programmable Gate Arrays FPGAs.

With reference to FIGS. 2 and 3, an updating of the boot loader for the auxiliary processor 10 will now be described. Prior to this updating, the main processor 50 has received a new boot loader via the external communication means 54. The received new boot loader has been checked with regard to its origin and its integrity. For example, if the boot loader is received encrypted and signed, the main processor 50 proceeds with a check of the imprint, also referred to as checksum, and decrypting of the received data constituting the boot loader. The signature methods employed are known methods, such as MD5 or SHA signatures. Likewise, the methods for encrypting and decrypting the data, symmetrical encrypting, referred to as with secret key, or asymmetric, referred to as with public key, are known, such as for example AES (Advanced Encryption Standard) or DES (Data Encryption Standard) or RSA (from the name of the authors "Rivest Shamir Adleman") algorithms. A phase 100 of updating a new boot loader therefore applies after the reception of a new valid boot loader stored locally, in one of the storage means available to the main processor 50, such as the RAM memory 51, the rewritable non-volatile memory 52 or the storage unit 53. In the case of use of the RAM 51 for locally storing the boot loader, if a power cut occurs during the update phase, the main processor 50 retrieves the new boot loader again, for example by downloading.

When the phase 100 of updating the boot loader is initiated, the auxiliary processor 10 changes operating mode. Indeed the device comprises a plurality of operating modes, in particular a usual operating mode and an update mode. The update mode enables replacing the current boot loader with a new boot loader. In the usual operating mode, the device may be in two operating states, firstly a normal operating state and secondly an abnormal operating state. The device is in the abnormal operating state when the boot loader has been invalidated; otherwise the device is in the normal operating state.

In a step 101, main processor 50 switches the auxiliary processor 10 into update mode. For this purpose, the main processor 50 uses the internal communication means 34. In a particular embodiment, the internal communication means 34 are based on input/output lines, the main processor 50 fixes on these input/output lines a dedicated vector value, referred to as update mode value, and then initiates rebooting of the auxiliary processor 10, the behaviour of which is described below with regard to FIG. 3.

Once the auxiliary processor 10 has booted in update mode, the main processor 50 can use update functionalities offered by the update software of the auxiliary processor 10. The available functionalities are in particular those enabling erasing, writing or reading the rewritable non-volatile memory 12.

In a step 102, the main processor 50 writes, or instructs the auxiliary processor 10 to write, the new boot loader in the rewritable non-volatile memory 12. For this purpose, the main processor 50 transfers the data of the new boot loader by way of the internal communication means 34.

In a step 103, the main processor 50 proceeds with a check on the integrity of the data present in the rewritable non-volatile memory 12. This check may be done in various ways, such as a computation of a checksum on the data written in the rewritable non-volatile memory 12. This checksum is then compared with a checksum computed on the data stored locally in the RAM 51 and which correspond to the new boot loader as obtained by the main processor 50. In a variant, the check is obtained by a complete re-reading and a comparison of the raw data present in the rewritable non-volatile memory 12 with the data stored locally in the RAM 51 and which correspond to the new boot loader as obtained by the main processor 50.

In a step 104, at the end of the check, the main processor 50 tests whether the result of the writing is valid or is not valid, in order to identify the presence of erroneous data in the rewritable non-volatile memory 12. If data are erroneous, the step 102 of writing data of the new boot loader is reiterated; otherwise, meaning if the data are valid, a step 105 is performed.

During the step 105, the main processor 50 switches the auxiliary processor 10 into the usual operating mode. For this purpose, the main processor 50 deletes the value of the update mode vector on the input/output lines of the internal communication means 34. Next the main processor 50 reboots the auxiliary processor 10 if necessary.

Finally, in a step 106, the update phase 100 ends, for example with a complete reboot of the device.

To enable the boot loader to be updated, the main processor 50 switches the auxiliary processor 10 into the update mode. With reference to FIG. 3, an algorithm shows the sequence 130 of booting the auxiliary processor 10.

In a step 131, the auxiliary processor 10 reads a value present on the input/output lines of the internal communication means 34.

In a step 132, the auxiliary processor 10 checks whether the read value corresponds to a vector value of the "update mode value" type. If the vector corresponds to the "update mode value", the auxiliary processor 10 performs a step 134. Otherwise the device boots in the usual operating mode and a step 135 is performed.

In the step 135, the auxiliary processor 10 executes the boot loader present in the rewritable non-volatile memory 12.

In the step 134, the auxiliary processor 10 executes the update software, for example by downloading the update software from the ROM 13 in the RAM 11 and executing the update software from the RAM 11. The auxiliary processor 10 then enables the main processor 50 to access the rewritable non-volatile memory 12 in order to perform the write or check steps related to the update phase described above in relation to FIG. 2.

The usual operating mode may be interfered with, in particular by a power cut during the update phase 100, which is a corner case situation. If such an event occurs, completeness of the update operation is not reached and the rewritable non-volatile memory 12 contains only part of the new boot loader. Because the quantity of software correctly written cannot be guaranteed, the behaviour of this partial software is not absolutely deterministic and may in particular block the device if the rewritable non-volatile memory 12 remains as is, or produce erratic behaviour.

In order to prevent this corner case situation, it is necessary firstly to make the boot loader present in the rewritable non-volatile memory 12 inoperative and secondly to provide a mechanism for emergency booting of the device. This emergency mechanism must be able to enable detecting this corner case situation and force a new update of the boot loader.

With reference to FIG. 4, the behaviour of the device in the event of a power cut will be presented with the corresponding procedure. This procedure is an interrupt procedure triggered by the occurrence of an external event received by the main processor 50. This event, or interruption, is produced by the monitoring means 32 when an electrical anomaly is detected on the power supply 30.

In a step 200, the procedure for interrupting the main processor 50 is activated following the reception of an interruption.

In a step 201, the main processor 50 checks the origin of the interruption, in order to ensure that the received interruption is related to an electrical anomaly. When the interruption does not correspond to an electrical anomaly, this interruption is processed independently from the algorithm in FIG. 4. The algorithm is then ended in a step 206. Otherwise, when an electrical anomaly is the cause of the interruption, a step 202 is performed.

In the step 202, the main processor 50 checks whether an update of the boot loader is underway. If there is no update underway, the algorithm is ended in the step 206. If the interruption occurs during the update, a step 203 is performed.

In the step 203, the update of the boot loader is interrupted.

In an optional step 204, the device is switched into an energy saving mode by stopping the electrical supply to non-vital components, meaning the components that are not essential to the functioning of the auxiliary processor 10 and of the main processor 50.

During a step 205, the main processor 50 sends to the auxiliary processor 10 an instruction to invalidate the boot loader present in the rewritable non-volatile memory 12. The steps 203 to 205 thus form a phase for securing the booting of the device 10. The algorithm is then ended in the step 206.

The boot loader can be invalidated in various ways. It is simply necessary for the data present in the rewritable non-volatile memory 12 not be able to be interpreted by the auxiliary processor 10 as instructions, so that the auxiliary processor 10 has a predictable behaviour. For example, instructions may be written so that the auxiliary processor 10 remains in a blocked state when executing these instructions. The data written in place of the boot loader may therefore all be data able to block the auxiliary processor 10 during a boot.

In a variant, the boot loader may be invalidated by way of NOP (No Operation) instructions not doing anything. By way of example, such an instruction is coded by the bytes 0x4e71 in the Motorola (registered trade mark) 680x0 microprocessors, or 0x00 for the family of Intel (registered trade mark) 8051 microcontrollers or 0x00000000 for the ARM (registered trade mark) family. It is also possible to replace the boot loader with an endless loop. By way of example, this may be achieved by a simple unconditional switching instruction that loops onto itself. In addition, some processors or microcontrollers, in particular those integrating the rewritable non-volatile memory, make available a function of global erasure of said rewritable non-volatile memory, which enables invalidating the boot loader.

As stated, the corner case situation also requires an emergency boot mechanism that can be substituted for the normal booting of the device in the event of a problem of corruption of the boot loader.

Thus, preferably, the main processor 50 checks whether the auxiliary processor 10 is in the normal operating state able to communicate with the main processor 50, and initiates the phase of updating the boot loader when the auxiliary processor 10 is not in the normal operating state.

Figure 6:
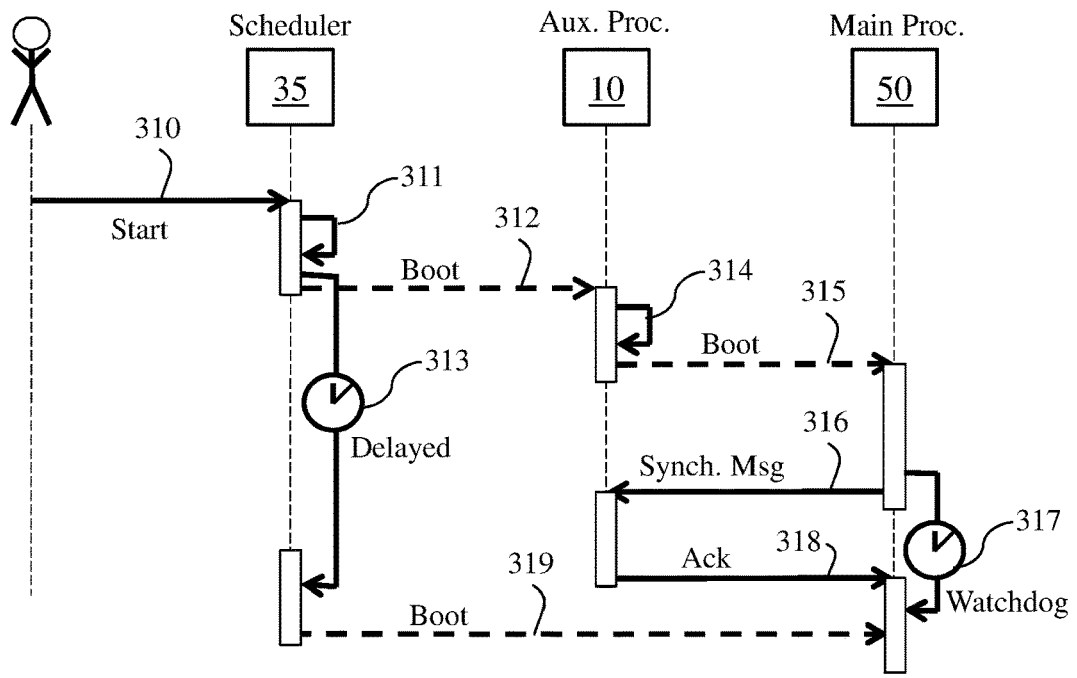
FIG. 6 is a schematic illustration of a first sequence for booting the device.
Figure 7:
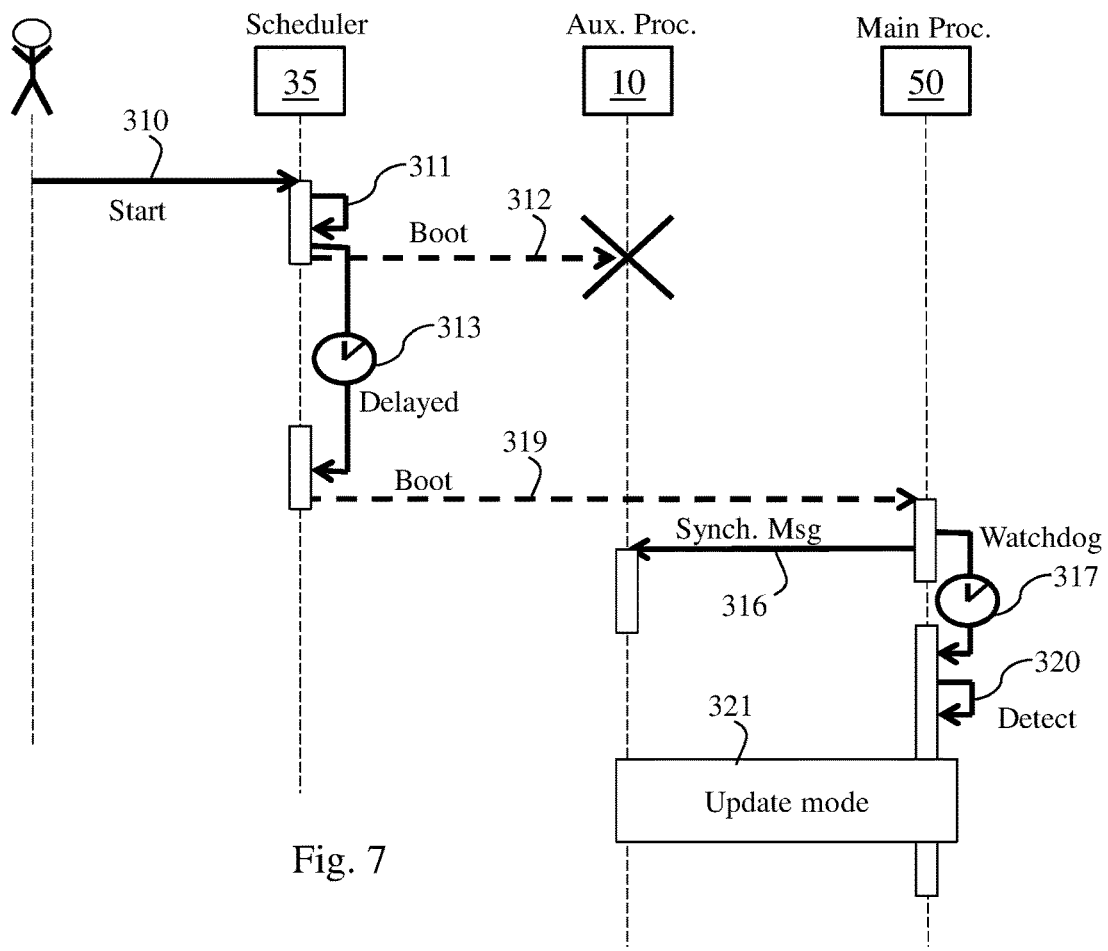
FIG. 7 is a schematic illustration of a second sequence for booting the device.

The behaviour of the device, and more particularly of the scheduler 35, during a boot phase, will now be described. Firstly, with reference to the diagram of sequences in FIG. 6, the description relates to a scenario where the boot loader is valid. Secondly, with reference to the diagram of sequences in FIG. 7, the description relates to a scenario where the boot loader has been invalidated. A boot sequencing is obtained by way of timers, but may also be obtained with delay lines or any other means of delaying one action with respect to another.

To use the device, the user performs an action for starting the device, such as for example by pressing on a start/stop button of the device or connecting the device to a mains socket. This action is detected by the device in a step 310 and information representing this action is communicated to the scheduler 35.

In a step 311, the scheduler 35 waits until components of the device are operational. The scheduler 35 typically initiates a time delay of predefined duration. In particular, the scheduler 35 awaits stabilisation of the power supply 30, but also the scheduler 35 awaits for example stabilisation of oscillators (not shown).

Next, in a step 312, the scheduler 35 orders the auxiliary processor 10 to boot and, in a step 313, initiates a delayed booting of the main processor 50 in accordance with a predefined delay.

In the usual operating mode, in a step 314, the auxiliary processor 10 executes the boot loader in response to the order received from the scheduler 35. The boot loader, in a step 315, orders the main processor 50 to boot and then, by way of a synchronisation procedure, the main processor 50 and the auxiliary processor 10 synchronise on each other, thus validating the booting of the device. This synchronisation procedure is for example implemented by an exchange of messages using the internal communication means 34. To illustrate this exchange, the main processor 50, in a step 316, sends a first synchronisation message to the auxiliary processor 10. In addition, in a step 317, the main processor 50 activates a watchdog to avoid remaining blocked while awaiting acknowledgement of the first synchronisation message. In a step 318, the auxiliary processor 10 being operational (meaning in a normal operating state), the auxiliary processor 10 responds by a second message, acknowledging the first message, before the expiry of the watchdog. The device boot phase is then terminated and the device is in the normal operating state.

In this case of usual functioning, the delayed booting initiated in a step 319 by the scheduler 35 has no effect on the functioning of the device, the main processor 50 already being started.

In a variant embodiment, in the case of usual functioning, the boot loader comprises instructions requesting the auxiliary processor 10 to block the booting of the main processor 50 during a predefined period, so that the delayed booting initiated in a step 319 by the scheduler 35 has no effect on the functioning of the device.

In the case where the boot loader has been invalidated, the auxiliary processor 10 does not execute any valid instruction for booting the main processor 50. The device has booted in usual operating mode, but the auxiliary processor 10 is in the abnormal operating state. This situation is illustrated by the sequence diagram in FIG. 7.

Just as for the normal operating scenario, the user performs an action for booting the device. This action is detected by the device in the step 310 and information representing this action is communicated to the scheduler 35. Then, in the step 311, the scheduler 35 waits for the components of the device to be operational.

Next, in the step 312, the scheduler 35 attempts to boot the auxiliary processor 10 and, in the step 313, initiates the delayed booting of the main processor 50. However, in this scenario, the auxiliary processor 10 remains blocked because of the invalidated boot loader.

The booting of the main processor 50 then occurs upon instruction from the scheduler 35, in the step 319, at the end of the predefined delay already mentioned. This delay is fixed so that the time elapsed since the booting of the auxiliary processor 10 by the scheduler 35 is greater than the time necessary, in the normal operating state, for the auxiliary processor 10 to be capable of receiving the first synchronisation message transmitted by the main processor 50. Once booted, in the step 316, the main processor 50 sends the first synchronisation message to the auxiliary processor 10 and, in step 317, activates the watchdog. However, the auxiliary processor 10 is not in the normal operating state and does not respond to the first synchronisation message. At the end of the delay fixed by the watchdog mechanism, the main processor 50, in a step 320, notes that the auxiliary processor 10 is not in the normal operating state, meaning the auxiliary processor 10 is not operational. The main processor 50, in a step 321, then switches the auxiliary processor 10 into update mode, and proceeds with the updating of the boot loader, as already described in relation to FIGS. 2 and 3.

Figure 5:
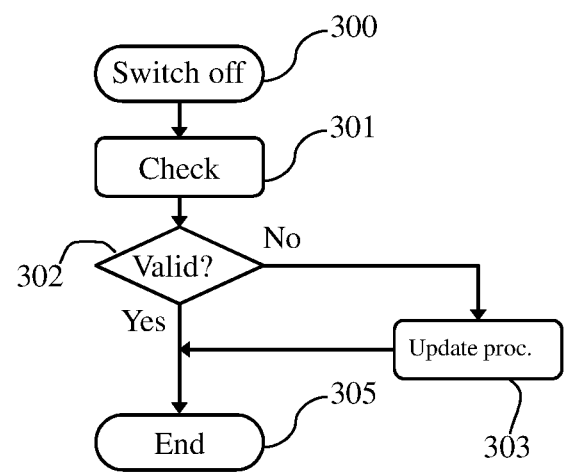
FIG. 5 is a schematic illustration of an algorithm for switching off the device.

The device whose behaviour is described above includes mechanisms for updating the boot loader without increasing the necessary device resources and in particular the capacity of the rewritable non-volatile memory used for storing the boot loader. However, corruption of stored data or instructions remains possible through erroneous writing in the rewritable non-volatile memory 12. In order to limit this risk, it is possible to force a systematic checking of the integrity of the boot loader each time the device is being switched off, whether the switching off is complete or corresponds to a "standby" mode with reduced energy consumption. "Standby" mode means for example a mode where only the auxiliary processor 10 is functioning and the components not essential to the functioning of the auxiliary processor 10 are then not power supplied. To perform this systematic check, the algorithm in FIG. 5 shows a switching-off procedure 300.

In a step 301, the main processor 50 checks the integrity of the boot loader present in the rewritable non-volatile memory 12.

In a step 302, the main processor 50 tests the result of the check. If the validity test is positive, a step 305 is performed. Otherwise the validity test is negative, thus revealing corruption of the boot loader present in the rewritable non-volatile memory 12, and the main processor 50 performs a step 303.

In the step 303, the main processor 50 implements the phase of updating the boot loader, as already described in relation to FIG. 2, and then the step 305 is performed.

In the step 305, the main processor 50 switches off the device and the algorithm is ended.

The invention claimed is:

1. A method of updating a boot loader stored in a rewritable non-volatile memory of a device comprising a first processor and a second processor, the first processor being configured for executing the boot loader, the method being implemented by the device and comprises a phase of delayed booting of the second processor with respect to booting of the first processor so that:

invalidate the boot loader when operation of the device is interrupted due to an interruption during updating of the boot loader;

when the boot loader has been invalidated due to the interruption during updating of the boot loader, the device boots the second processor in a mode where the first processor is blocked from booting because the boot loader has been invalidated, the second processor checks, when booting, whether or not a message to synchronize the first and second processors is received from the first processor, and, when the second processor does not receive the message from the first processor, the second processor initiates a mode of updating the boot loader; and when the boot loader has not been invalidated due to the interruption, the device boots with the boot loader so that the first processor boots with the boot loader and the boot loader requests the first processor to boot the second processor and, after booting the first processor and the second processor, synchronize the first processor and the second processor with message exchanges between the first processor and the second processor.

2. The method according to claim 1, wherein when updating the boot loader, the second processor performs:

switching the first processor in the mode of updating the boot loader;

writing new boot loader in the rewritable non-volatile memory;

checking whether or not the new boot loader as written in the rewritable non-volatile memory is valid;

repeating the updating of the boot loader from writing the new boot loader, when the new boot loader as written is not valid; and switching the first processor in a usual operating mode, when the new boot loader as written is valid.

3. The method according to claim 1, wherein, the first processor has an operating state and the second processor sets the operating state of the first processor by performing steps of:

sending a first message to the first processor;

indicating the operating state of the first processor as normal, when the second processor receives a second message acknowledging the first message within a predefined time period; and indicating the operating state of the first processor as abnormal, when the second processor does not receive the second message acknowledging the first message within the predefined time period.

4. The method according to claim 1, further comprising, when powering off said device:

checking whether or not the boot loader stored in the rewritable non-volatile memory is valid; and launching, using the second processor, the updating of the boot loader, when the boot loader stored in the rewritable non-volatile memory is not valid.

5. Non-transitory information storage medium storing a computer program comprising instructions for updating a boot loader stored in a rewritable non-volatile memory of a device comprising a first processor and a second processor, the first processor being configured for executing the boot loader, the device being configured for implementing a phase of delayed booting of the second processor with respect to booting of the first processor, the instructions, when executed by the first processor and/or the second processor control the device to:

invalidate the boot loader when operation of the device is interrupted due to an interruption during updating of the boot loader, when the boot loader has been invalidated due to the interruption during updating of the boot loader, boot the second processor in a mode where the first processor is blocked from booting because the boot loader has been invalidated, the second processor checks, when booting, whether or not a message to synchronize the first and second processors is received from the first processor, and, when the second processor does not receive he message from the first processor, initiate a mode of updating the boot loader using the second processor, and when the boot loader has not been invalidated due to the interruption, boot with the boot loader so that the first processor boots with the boot loader configured to request the first processor to boot the second processor and, after booting the first processor and the second processor, synchronize the first processor and the second processor with message exchanges between the first processor and the second processor.

6. A device comprising first and second processors and a rewritable non-volatile memory, the device being configured for updating a boot loader stored in the rewritable non-volatile memory, the first processor being configured for executing the boot loader, the device being configured for implementing a phase of delayed booting of the second processor with respect to booting of the first processor so that:

the device is configured to invalidate the boot loader when operation of the device is interrupted due to an interruption during updating of the boot loader;

when the boot loader has been invalidated due to the interruption during updating of the boot loader, the device is configured for booting the second processor in a mode where the first processor is configured to be blocked from booting because the boot loader has been invalidated, the second processor is configured for checking, when booting, whether or not a message to synchronize the first and second processors is received from the first processor, and the second processor is configured, when the second processor does not receive the message from the first processor, for initiating a mode of updating the boot loader; and when the boot loader has not been invalidated due to the interruption, the device is configured for booting with the boot loader so that the first processor boots with the boot loader and the boot loader requests the first processor to boot the second processor and, after booting the first processor and the second processor, synchronize the first processor and the second processor with message exchanges between the first processor and the second processor.

* * * * *